(12) United States Patent
Bratt et al.

(10) Patent No.: US 6,967,754 B2
(45) Date of Patent: Nov. 22, 2005

(54) HYBRID OPTICAL TRANSCEIVERS FOR FREE SPACE OPTICAL COMMUNICATION

(76) Inventors: Nicholas E. Bratt, 7916 196th Pl. SW., Edmonds, WA (US) 98026; Chace H. Fadlovich, 627 221st St. SW., Bothell, WA (US) 98021; Robert M Pierce, 20007 131st Pine, Woodinville, WA (US) 98072

( * ) Notice: Subject to any disclaimer, the term of this patent is extended or adjusted under 35 U.S.C. 154(b) by 124 days.

(21) Appl. No.: 10/020,518

(22) Filed: Dec. 14, 2001

(65) Prior Publication Data

US 2004/0004745 A1 Jan. 8, 2004

(51) Int. Cl.[7] .................................. G02B 5/32
(52) U.S. Cl. ................ 359/15; 359/19; 398/135; 398/138; 398/128
(58) Field of Search .............. 359/15, 19, 1; 398/84, 118, 122, 128–131, 135, 138

(56) References Cited

U.S. PATENT DOCUMENTS

| | | | |
|---|---|---|---|
| 4,838,630 A | * | 6/1989 | Jannson et al. ........... 359/3 |
| 5,295,208 A | | 3/1994 | Caulfield |
| 5,465,311 A | | 11/1995 | Caulfield |
| 5,515,184 A | | 5/1996 | Caulfield |
| 5,638,469 A | | 6/1997 | Feldman |
| 5,682,255 A | | 10/1997 | Friesem et al. |
| 5,710,645 A | | 1/1998 | Phillips |
| 5,822,089 A | | 10/1998 | Phillips |
| 5,854,697 A | | 12/1998 | Caulfield |
| 5,974,162 A | | 10/1999 | Metz |
| 5,986,746 A | | 11/1999 | Metz |
| 6,061,463 A | | 5/2000 | Metz |
| 6,151,142 A | | 11/2000 | Phillips |
| 6,278,534 B1 | | 8/2001 | Arns |
| 6,498,662 B1 | | 12/2002 | Schuster |
| 6,724,508 B2 | | 4/2004 | Pierce et al. |
| 2002/0021855 A1 | | 2/2002 | Kim |

FOREIGN PATENT DOCUMENTS

| | | |
|---|---|---|
| EP | 0 580 905 | 7/1992 |
| EP | 0 607 906 | 1/1994 |
| WO | WO 99/34539 | 7/1999 |
| WO | WO 02/17516 A2 * 12/2002 | .......... 359/15 |

OTHER PUBLICATIONS

Jenkins et al., *Fundamentals of Optics*, Third Edition, pp. 16-17 (1957).

* cited by examiner

*Primary Examiner*—Fayez G. Assaf
(74) *Attorney, Agent, or Firm*—Klarquist Sparkman, LLP (57) ABSTRACT

Optical transceivers include a diffractive optical element (DOE) attached to a surface of a prism or other optical support. The DOE is configured to direct an input optical signal to a curved reflective surface or receive an output optical signal from the curved reflective surface at angles greater than a critical angle. In some examples, the optical support includes one or more curved reflective surfaces and the DOE is a hologram. Such optical transceivers can be provided with optical mounts configured for attachment to a building window.

5 Claims, 11 Drawing Sheets

HYBRID OPTICAL TRANSCEIVERS FOR FREE SPACE OPTICAL COMMUNICATION

TECHNICAL FIELD

The invention pertains to methods and apparatus for free space optical communication.

BACKGROUND AND SUMMARY

While guided wave optical systems have become commonplace in telecommunications, such systems exhibit several practical limitations. Installation of such systems in existing buildings can be disruptive and labor intensive, and in some cases cannot be economically configured to reach all building areas for which optical communication services are desired. Communication applications between two or more buildings or other locations typically require underground installation of optical cables in existing utility tunnels or burial in newly dug trenches. Installation in either of these manners can be slow and expensive. In addition, reconfiguration of a guided wave communication system can be difficult as additional optical fiber or other waveguide must be installed to reach any newly selected locations. As a result, an installed communication system can require expensive upgrades.

Free space optical communication systems do not exhibit the limitations associated with the installation and maintenance of guided wave optical communication systems. Such systems include optical transmitters and receivers that are configured to deliver and receive optical signals propagating in free space, and waveguides are not needed to connect the transmitter and receiver. In addition, such transmitters and receivers can be portable and readily adapted to a user's varying communication requirements.

While free space optical communication systems have numerous advantages, such systems typically have several drawbacks. Transmitter and receiver locations can be easily changed but a transmitter and an associated receiver must be located within a line of sight. In communication between existing commercial buildings or other structures, such transmitters/receivers are conveniently placed near windows, but frequently block unacceptably large portions of the window. In addition, free space optical systems are also susceptible to light from sources other than the desired transmitter. For example, sunlight or room illumination can be detected and interfere with a modulated optical carrier that contains a desired data stream. Free space optical systems are also subject to mechanical disturbances because they are frequently placed in exposed locations. For these reasons, improved free space optical communication systems, methods, and apparatus are needed.

SUMMARY

Free space optical systems can use optical transceivers to transmit and receive optical signals. Optical transceivers can be configured to receive optical signals from a source such as a modulated laser diode or other source, and process the optical signal for free space transmission. Such transceivers can also be configured to receive optical signals propagating in free space and to process such signals for delivery to an optical detection system that includes an optical detector such as a photodiode or avalanche photodiode. In representative examples, optical transceivers include a diffractive optical element such as a hologram and an optical support having at least a first surface and a second surface. The diffractive optical element is configured to direct at least a portion of an input optical signal to the first surface and the first surface has a curvature configured to converge the portion of the input optical signal and direct the converged portion to the second surface. According to representative examples, the optical support includes a third surface and the diffractive optical element is a transmission hologram that is attached to the third surface. According to other illustrative examples, the diffractive optical element is configured so that the portion of the input optical signal directed by the diffractive optical element to the first surface propagates at an angle that is greater than or equal to a critical angle with respect to the third surface. In additional examples, a hologram is configured to direct optical signals in a selected wavelength range to the first surface so that optical signals outside of the selected wavelength are not directed to the first surface.

Optical supports for an optical transceiver include a first surface configured to receive a hologram or other diffractive element and a second surface having optical power sufficient to at least partially converge an optical signal received from the first surface. A coupling surface is situated to receive the partially converged optical signal from the second surface and direct the partially converged optical signal to exit the optical support. In some examples, the second surface is a reflective optical surface situated to receive an optical signal from the first surface and that propagates at an angle greater than the critical angle with respect to the first surface.

According to additional examples, optical supports include a fourth surface configured to receive the optical signal from the second surface and direct the optical signal to the coupling surface and, in some examples, the fourth surface has an optical power that tends to converge the input optical signal received from the second surface. According to other examples, the second surface and the fourth surface are reflective surfaces and the coupling surface is a portion of the second surface.

Optical supports for an optical transceiver include first and second planar surfaces, wherein the second planar surface is tilted and substantially parallel with respect the first surface. A curved reflective surface is configured to receive an optical signal from the first planar surface that propagates at an angle greater than a critical angle with respect to the first planar surface. A coupling surface is configured to receive the optical signal from the curved reflective surface.

Adjustable optical transceivers include an optical support configured to receive an optical signal and having a first curved surface. A diffractive optical element is situated at a surface of the optical support and is configured to transmit the optical signal. A reflector is configured to receive the optical signal from the diffractive optical element and direct the optical signal to the diffractive optical element. The reflector is adjustable so that at least a portion of the optical signal directed to the diffractive optical element by the reflector is directed to the first curved surface by the diffractive optical element. According to representative examples, the diffractive optical element is a hologram. According to additional examples, a reservoir of an index matching liquid is configured so that the index matching fluid is situated between the diffractive optical element and the reflector.

Optical mounts for optical transceivers include a contact plate having a mounting surface configured to be attachable to a window. An adjustment plate includes an adjustment mechanism configured to press against the contact plate and an attachment portion configured for attachment of a an optical component. Optical mounting assemblies include two or more such optical mounts.

Methods of receiving an optical signal include directing the optical signal to a diffractive optical element that is configured to direct at least a portion of the optical signal to a surface of an optical support. The diffractive optical element is situated at a coupling surface so that the portion propagates in the optical support at an angle greater than a critical angle with respect to the coupling surface. According to additional examples, the portion of the optical signal is directed to a surface of the optical support having optical power and the curvature of the surface corresponds to a section of a parabola.

Methods of transmitting an optical signal include directing the optical signal to a surface of an optical support at an angle greater than a critical angle with respect to the surface. A diffractive optical element is provided at the surface of the optical support so that at least a portion of the optical signal is directed out of the optical support. In further examples, the optical signal is directed to a curved surface of the optical support having optical power before the optical signal is directed to the surface associated with the diffractive element. In other examples, the curved surface corresponds to a section of a parabola.

Methods of receiving an optical signal include directing the optical signal through a diffractive optical element and reflecting the optical signal back to the diffractive optical element at an angle such that the optical signal is directed by the diffractive optical element to an optical surface having optical power. According to additional embodiments, an optical support is provided having an attachment surface for the diffractive optical element and the optical signal is directed back to the diffractive optical element through an index matching material. In additional examples, the portion of the optical signal directed to the optical surface having optical power propagates at an angle greater than a critical angle with respect to the mounting surface of the diffractive optical element.

These and other features and advantages are set forth with reference to the accompanying drawings.

DETAILED DESCRIPTION

Figure 1:
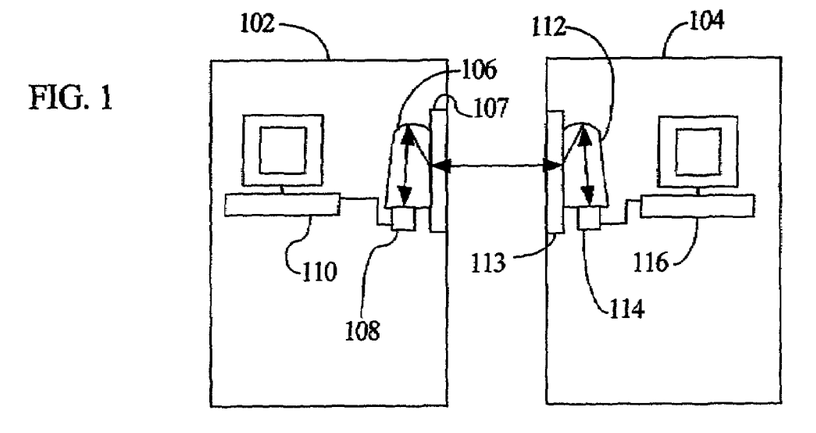
FIG. 1 is a block diagram of a free space optical communication system illustrating communication between two buildings.

With reference to FIG. 1, a communication system is configured to transmit data, voice, or other information between buildings 102, 104. An optical transceiver 106 is situated at or near a window 107 and is configured to transmit optical signals produced by an optical transmitter/receiver module 108 to the building 104. The optical transceiver 106 is also configured to receive optical signals from the building 104 and direct the received optical signals to the optical transmitter/receiver module 108. The received optical signals are converted to electrical signals at the transmitter/receiver module 108 or can be deliver by an optical fiber or other optical apparatus to a server 110 that includes electrical-to-optical and/or optical-to-electrical conversion circuitry. The associated electrical signal is then processed by the server 110 or other computer or network element.

An optical transceiver 112 is similarly configured at the building 104 for communication with the building 102. The optical transceiver 112 is situated at or near a window 113 and is configured to transmit optical signals to and receive optical signals from the optical transceiver 106. Received optical signals are directed to a transmitter/receiver module 114 that is in communication with a server 116 or other computer or network element. The transmitter/receiver module 114 can include optical-to-electrical converters or can be configured to transmit optical signals to and from optical-to-electrical conversion circuitry located at, for example, the server 116.

Representative optical transceiver configurations are illustrated schematically in FIGS. 2–7, 9, and 11–13. For convenience, surface curvatures are shown for purposes of illustration only and it will be apparent how surface curvatures can be selected and configured. In addition, multiple surfaces are shown for producing optical beam convergence and focusing, but surfaces can also be selected to produce beam divergence and defocusing as well as aberration correction and various telescope configurations can be adapted for such use. Descriptions of example transceiver configurations are provided with reference to transceiver use as a transmitter, receiver, or both. The example transceivers can generally be used for both applications and for convenience, are described with reference to transmitter or receiver use only. Optical surfaces through which optical signals are received from an optical source for transmission, or delivered to an optical detection system are referred to as coupling surfaces. Examples are described with reference to holograms, but other diffractive optical elements can be used. In some examples, some surfaces are tilted with respect to others, but nevertheless remain approximately parallel. For convenience, tilted, substantially parallel surfaces are defined as surfaces that are tilted at angles of less than about 20 degrees with respect to each other.

In some examples, optical signals propagate within an optical support or a prism at angles with respect to one or more surfaces such that the optical signals are totally internally reflected. As used herein, such optical signals are referred to as propagating at angles greater than a critical angle with respect to a surface. While such critical angles generally depend on a ratio of refractive indices, and as used herein an index of refraction of an optical support material and an index of refraction of air can be used to determine critical angles.

Figure 2:
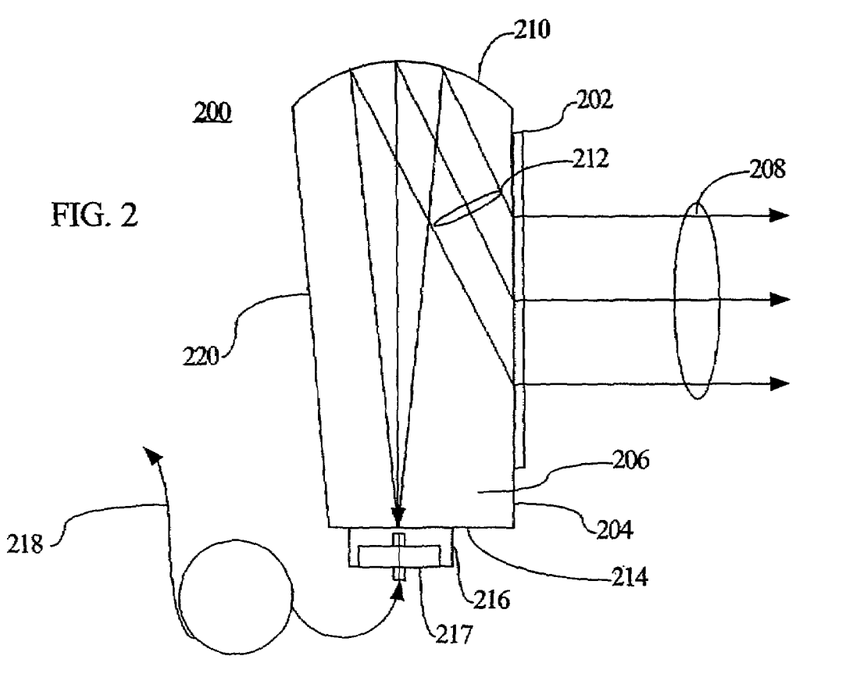
FIG. 2 is a schematic diagram of an optical transceiver configured for use in a free space optical communication system.

A representative optical transceiver 200 configured to transmit and receive optical signals is illustrated in FIG. 2. The transceiver 200 includes a hologram 202 applied to a surface 204 of an optical support 206. The hologram 202 is configured to direct or diffract an input optical beam 208 to a reflective surface 210. The reflective surface 210 is illustrated for convenience as a spherical surface but the reflective surface 210 typically corresponds to an off-axis section of a parabola and is configured to direct a diffracted optical beam 212 to converge at or near a surface 214. Other shapes can be used for the surface 210 such as on- or off-axis parabolic, elliptical, hyperbolic, spherical, aspheric, or toric sections. Optical power can also be provided by the hologram 202. To enhance reflectivity, the surface 210 can be coated with a reflective coating such as a metallic coating of aluminum, silver, gold, nickel, chromium, rhodium, or a combination of these or other metals. Dielectric coatings can also be used such as multilayer coatings that include alternating layers of high and low refractive index materials. Alternatively, a hologram can be provided.

The optical support 206 can be made of various optical materials including plastic optical materials such as acrylics, polycarbonates, optical glasses, fused silica, and other optical materials. The optical material is generally selected based on considerations such as cost and optical properties such as transmittance in a wavelength range over which a transceiver is to be used. A wavelength range in which optical communication components are readily available is between about 500 nm and about 1700 nm, but other wavelengths can be used. In some applications, wavelength ranges are selected based on eye safety considerations or on building window transmittances. Surfaces of the optical support 206 such as the surface 210 and the surface 214 can be formed by polishing, molding processes such as injection molding, casting, machining or other process. In addition, such surfaces can be defined by additional optical elements that are attached to the optical support 206 by, for example, an optical epoxy or other adhesive. As a specific example, a flat optical surface can be provided by attachment of an optical window or other optically flat substrate to the optical support. By providing optical surfaces on the optical support 206, a mechanically and optically robust transceiver configuration is obtained.

As shown in FIG. 2, the diffracted beam 212 is produced by the hologram 202 but other optical elements can be used instead of the hologram 202. For example, replica diffraction gratings or ruled diffraction gratings can be used, and such gratings can be blazed for improved diffraction efficiency. Ronchi rulings can be used as well, and optical power can be included in the hologram 202 so that some focusing of the diffracted beam 212 is produced. As used herein, a hologram refers to a recorded optical interference pattern, and can be configured for use in reflection or in transmission.

The diffracted optical beam 212 is converged by the surface 210 and delivered to an optical fiber module 216 situated at the surface 210. According to the example of FIG. 2, the optical fiber module 216 includes a fiber connector bulkhead adapter 217 that receives an optical fiber 218 so that the converged optical signal is delivered to the optical fiber 218. Typically, an end of the optical fiber 218 is connectorized for attachment to the bulkhead adapter 217, and in a specific example, the fiber 218 is provided with a so-called FC type connector and the bulkhead adapter 217 is an FC adapter.

The optical transceiver 200 is configured for transmission and reception of optical signals. An optical signal can be delivered by the optical fiber 218 to the surface 210 and to the surface 204 and outwardly directed by the hologram 202. Thus, the optical transceiver can server either as a transmitting transceiver or a receiving transceiver.

A surface 220 of the optical support 206 is configured to be non-parallel with respect to the surface 204. Providing a relative tilt between these surfaces reduces the magnitude of optical signals that experience one or more reflections by the surfaces 204, 220 or other surfaces that are undesirably delivered to optical receiver modules. In addition, to reduce unwanted optical signals, portions of the surfaces 204, 210, 214, 220, and other surfaces can be provided with absorbing optical coatings. Such coatings can be configured to absorb at wavelengths associated with stray light. As shown in FIG. 2, the surface 220 is configured so that the optical support 206 tapers toward the surface 204, but in other examples the surface 220 can be configured so that the optical support tapers toward the surface 210.

The hologram 202 is configured to direct selected optical signals to the surface 210 and to permit unselected optical radiation to propagate towards the surface 220. Such unselected signals can be absorbed with an absorbing coating situated on the surface 220 or the surface 220 can be provided with an antireflection coating to increase the portion of the unselected radiation that exits the transceiver 206. In addition, as shown in FIG. 2, the hologram 202 is configured to direct signal light at a wavelength of about 783 nm at an angle of about 36.2 degrees with respect to a line perpendicular to the surface 204. For this angle, a hologram thickness of about 20 $\mu$m is selected to reduce polarization dependence of the diffraction efficiency of the hologram 202. (Hologram diffraction efficiency is generally a function of light polarization direction with respect to the fringe direction recorded in the hologram.)

The diffracted optical signal 212 can propagate within the optical support 206 at an angle with respect to the surface 204 that is greater than the critical angle. Thus, stray light can accompany the diffracted optical signal only if diffracted by the hologram 202. Generally the hologram 202 is configured to diffract only selected wavelengths (and not wavelengths associated with stray light or background light), so that little unwanted light accompanies the desired signal light. In particular, the hologram 202 can appear clear or highly transmissive at some wavelengths and have a high diffraction efficiency at a selected communication wavelength. Because the desired signal light is generally received through a small aperture (such as a core of a multimode fiber or a single mode fiber), non-signal wavelengths that are diffracted at other angles are not efficiently coupled for detection or transmission.

Figure 3:
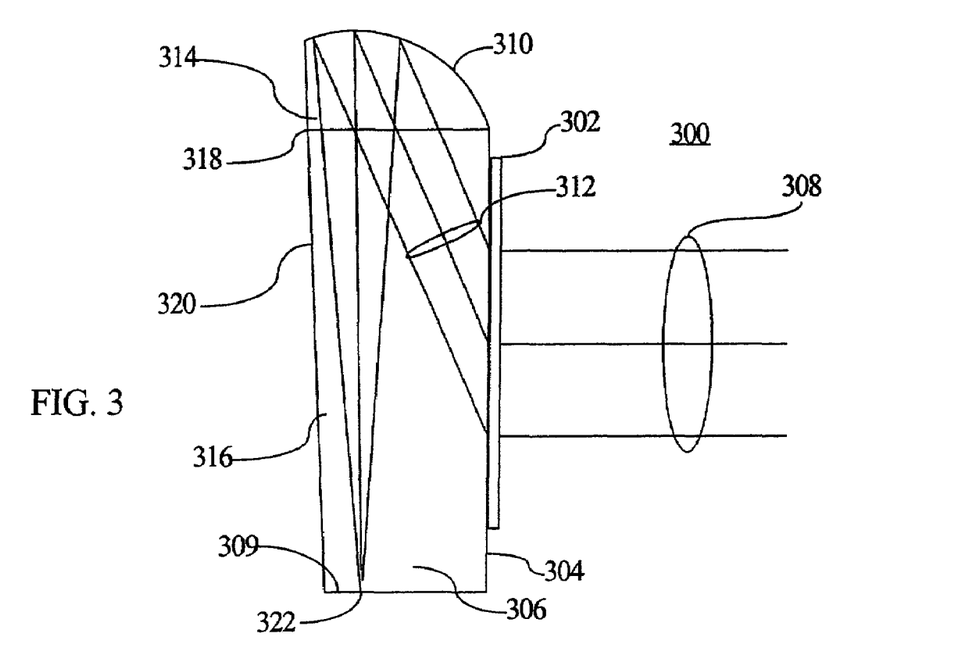
FIG. 3 is a schematic diagram of an optical transceiver configured for use in a free space optical communication system.

With reference to FIG. 3, an optical transceiver 300 includes a hologram 302 or other light directing element situated at or bonded to a surface 304 of an optical support 306. The optical transceiver 300 is configured to receive an optical signal 308 through the hologram 302, and to direct a diffracted or otherwise deflected portion 312 of the optical signal to a surface 310 and to a surface 309. The optical support 306 includes a first portion 314 and a second portion 316 that are bonded at an interface surface 318. A surface 320 is configured to reduce multiple reflections within the optical support 306 and direct any such reflected light away from a collection region 322.

Figure 4:
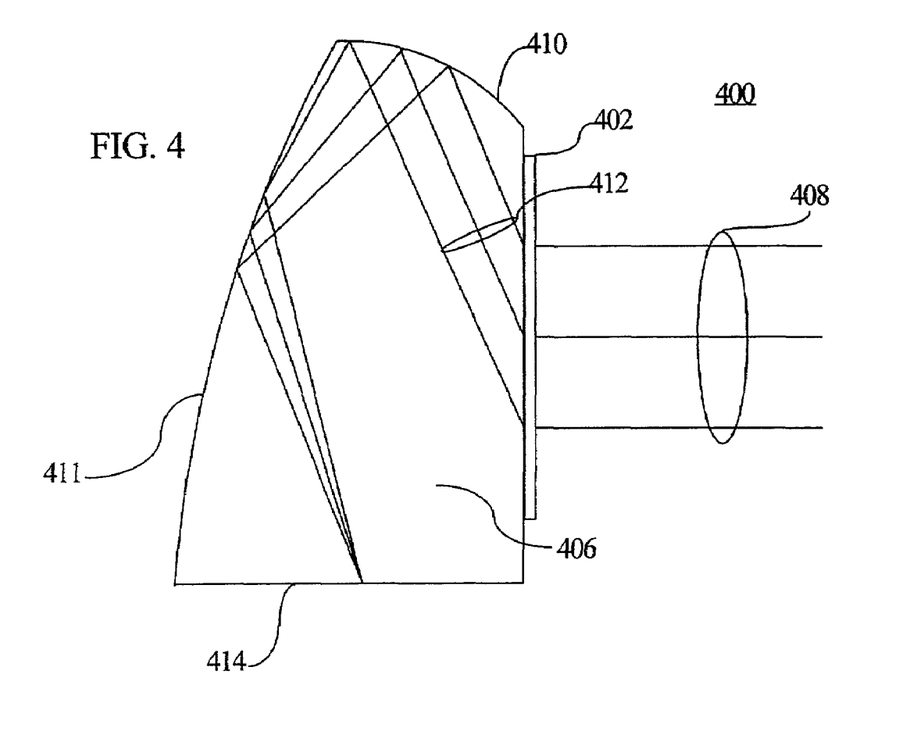
FIG. 4 is a schematic diagram of an optical transceiver configured for use in a free space optical communication system.

With reference to FIG. 4, an optical transceiver 400 includes a hologram 402 configured to direct a portion 412 of an input optical signal 408 toward a first curved surface 410 and a second curved surface 411. The surfaces 410, 411 are selected to converge the portion 412 at or near a surface 414. As shown in FIG. 4, an optical support 406 includes two surfaces (the surfaces 410, 411) that have optical power and serve to converge or otherwise focus the signal portion 412.

Figure 5:
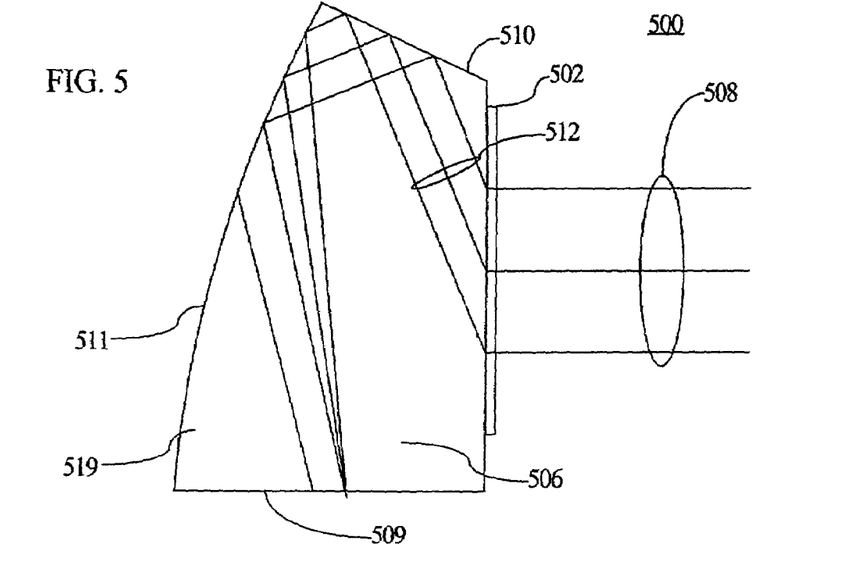
FIG. 5 is a schematic diagram of an optical transceiver configured for use in a free space optical communication system.

With reference to FIG. 5, an optical transceiver 500 includes a hologram 502 that is configured to direct a diffracted portion 512 of an input optical signal 508 to a planar surface 510 and to a curved surface 511 that is configured to converge the diffracted portion 512, typically at or near a surface 509. The surfaces 510, 511 are conveniently provided on an optical support 506, but the optical support 506 can be configured as two or more pieces bonded together. In addition, an unused portion 519 of the optical support 506 can be removed.

Figure 6:
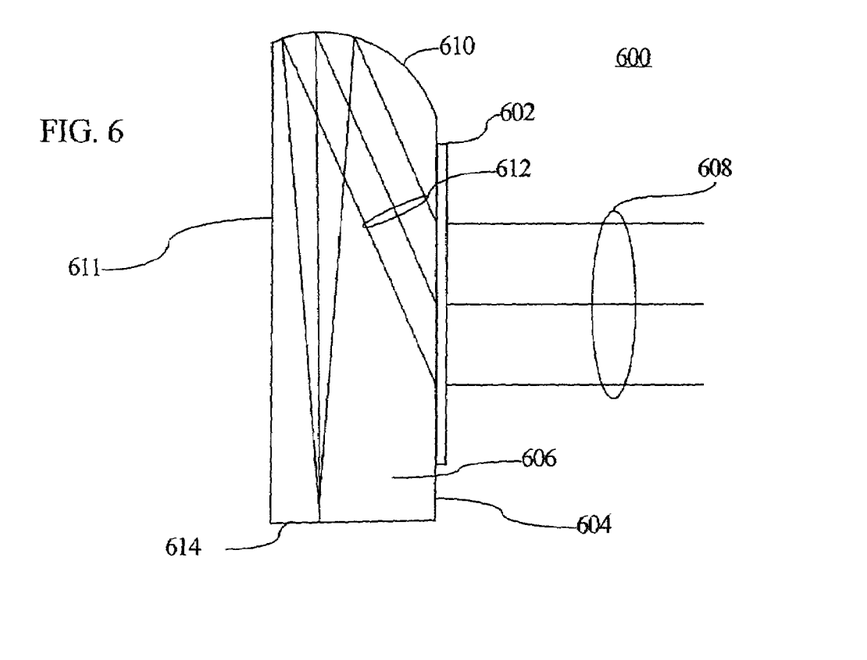
FIG. 6 is a schematic diagram of an optical transceiver configured for use in a free space optical communication system.
Figure 7:
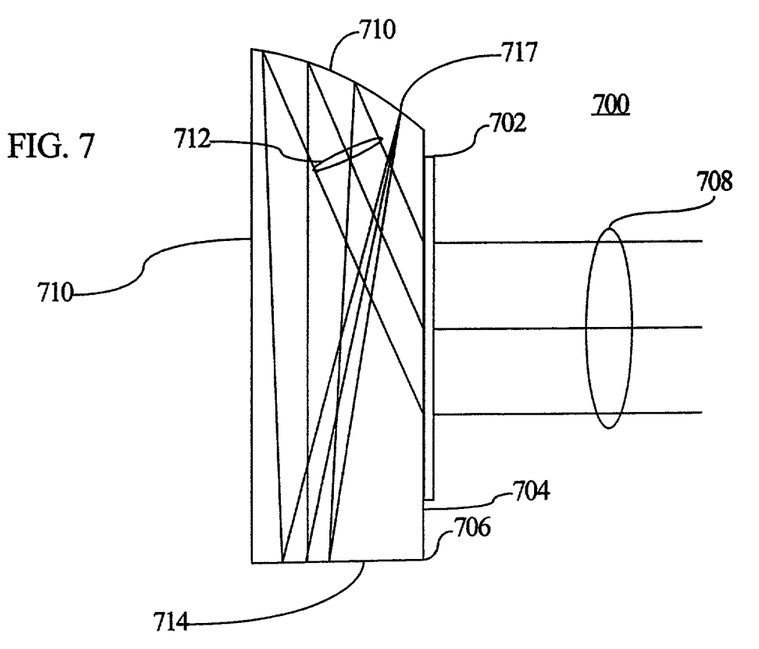
FIG. 7 is a schematic diagram of an optical transceiver configured for use in a free space optical communication system.

Additional illustrative embodiments are illustrated in FIGS. 6–7. Referring to FIG. 6, a transceiver 600 includes a Ronchi ruling 602 configured to direct an optical signal portion 612 of an input optical signal 608 to a curved surface 610 and to an output surface 614 of an optical support 606. A rear surface 611 is arranged approximately parallel to a front surface 604. The shape or curvature of the curved surface 610 is selected to converge the optical signal portion 612.

Referring to FIG. 7, an optical transceiver 700 includes a first surface 704 that supports a hologram 702 that is configured to direct a signal portion 712 to a curved surface 710. The curved surface 710 is selected to converge the signal portion 712 and to direct the signal portion 712 to a surface 714 that reflects the signal portion 712 back to the surface 710. As shown in FIG. 7, the signal portion 712 converges at or near the surface 710 at a location 717 and can be collected by an optical system or an optical fiber and delivered to an electrical system for conversion into an electrical signal.

Several example optical transceivers are described above with reference to receiving optical signals. These example transceivers also serve as transmitters in which a converged optical signal is processed or collimated by one or more curved surfaces and then directed along an output direction by a hologram or other optical element. In additional examples, optical transceivers are configured so that diffracted or deflected optical signal portions are reflected by one or more surfaces, and can be reflected by a single surface one or more times. In other alternative examples, two holograms are attached to a single optical support so that one is used for transmission and the other is used for reception. In such examples, separate optical fibers can be provided for delivering optical signal to the transceivers and obtaining optical signals from the transceivers.

Figure 8:
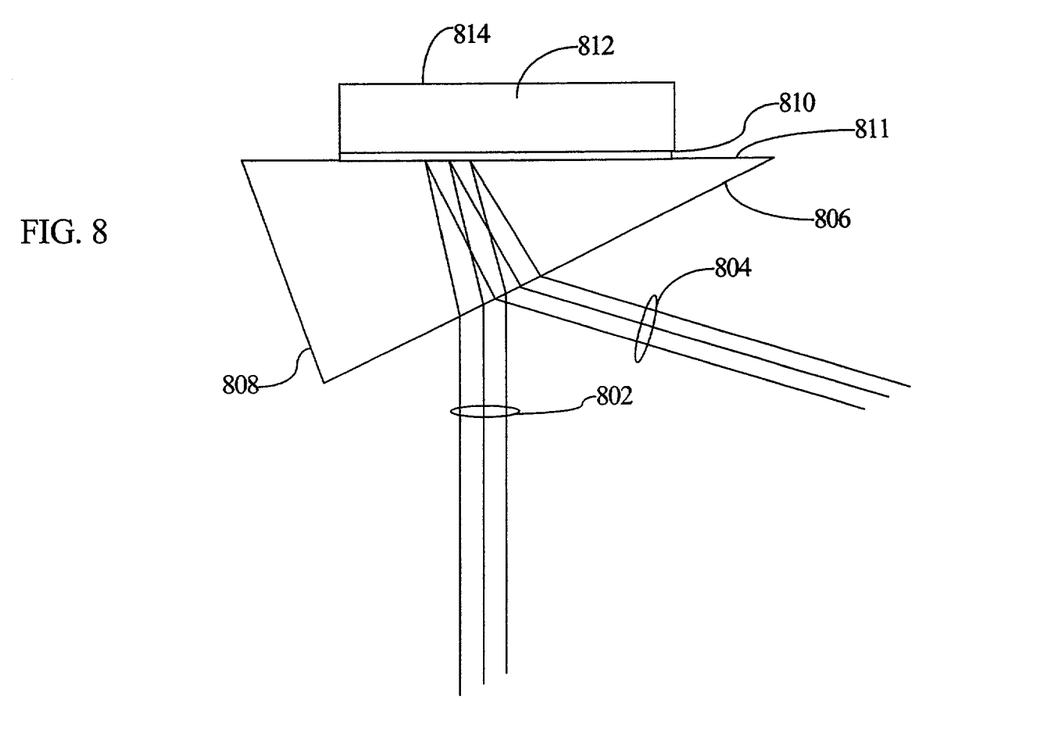
FIG. 8 is a schematic diagram of an arrangement for recording a hologram for use in an optical transceiver.

An arrangement for recording a hologram for use in the optical transceivers described above is illustrated in FIG. 8. Spatially filtered optical beams 802, 804 are directed to a surface 806 of a prism 808. The optical beams interfere at a holographic recording element 810 situated at a surface 811 of the prism 808. The holographic recording element 810 typically includes a photosensitive layer and a transparent support layer. Alternatively, a photosensitive layer can be applied directly to the surface 811. The holographic recording element is placed on the surface 811 and reflections by the holographic recording element 810 are reduced by index matching to the surface 811 with, for example, an index matching liquid. A rectangular prism 812 is placed on the holographic recording element 810 and index matched. A back surface 814 of the rectangular prism 812 is coated with an absorbing coating to reduce reflections.

Optical transceivers are typically configured for use with optical signals in wavelength ranges for which common holographic recording materials are not the most sensitive. Accordingly, hologram recording is configured based on the difference in recording wavelength and playback wavelength. In a representative example, the recording wavelength is a wavelength associated with an argon ion laser (for example, 488 nm or 514.5 nm) and the playback wavelength is about 785 nm. Non-standard holographic materials that are more sensitive at playback wavelengths can also be used. In some examples, holograms such as the hologram 202 are recorded using HRF-600-X 113-6*0.5 photopolymer available from DuPont Corporation, Wilmington, Del. In addition, shrinkage of holographic materials can be compensated and as noted above, a thickness of a holographic recording material can be selected to reduce polarization dependence of hologram diffraction efficiency. Index of refraction modulation in a hologram can be associated with polarization dependence of diffraction efficiency, and selection of an index modulation permits control of polarization dependence. Such holographic configurations are described in, for example, H. Kogelnik, "Coupled Wave Theory for Thick Holograms," Bell Sys. Tech. J. 48:2909–2947 (1969), which is incorporated herein by reference.

Figure 9:
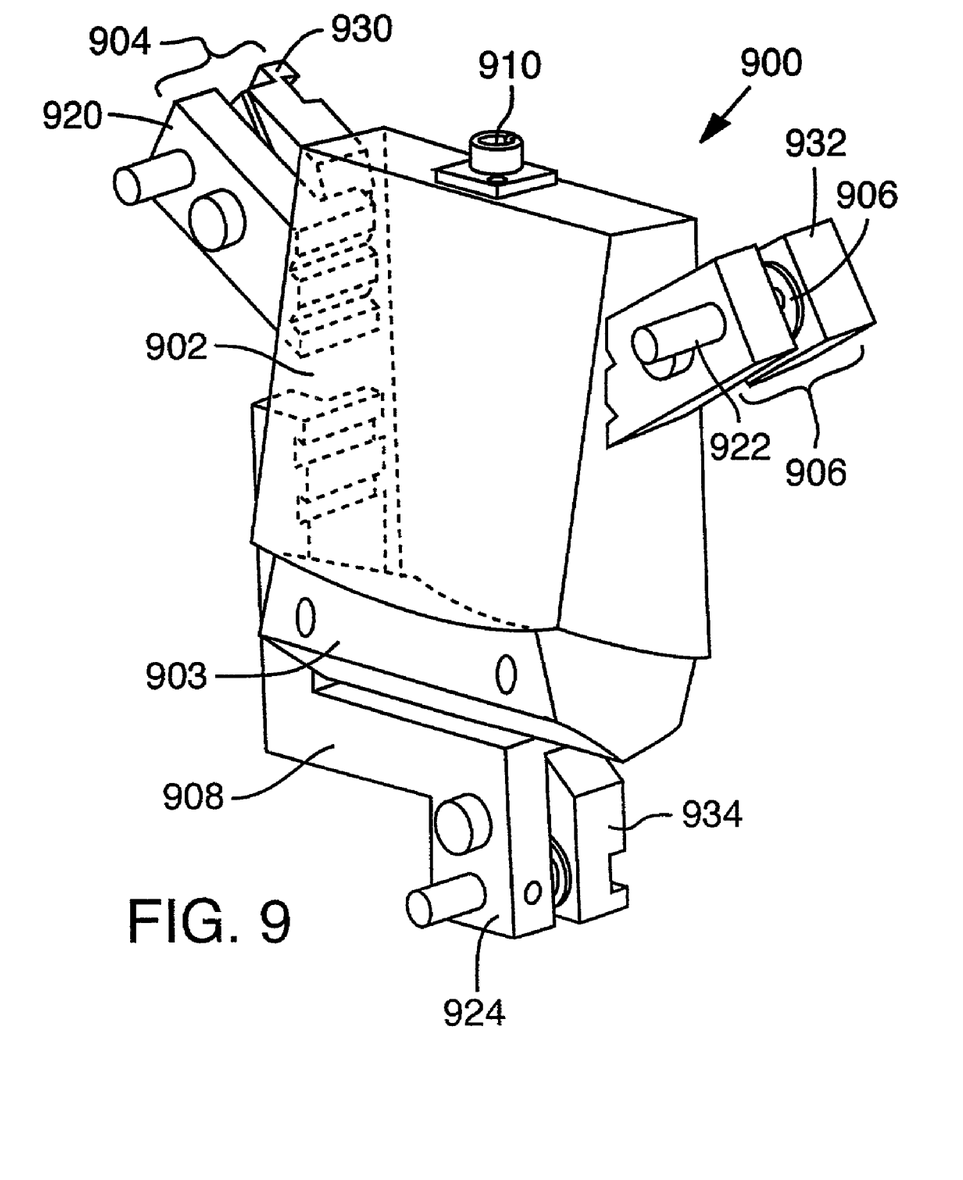
FIG. 9 is a diagram illustrating an optical transceiver configured for mounting to a window.

A mounted optical transceiver 900 is illustrated in FIG. 9. The transceiver 900 includes an optical support 902 and a mirror section 903 that is attached to the optical support 902 and that defines a reflecting surface for input/output optical signals. Optical signals are delivered to the optical transceiver 900 at a fiber connector adapter 910. The transceiver 900 is aligned with alignment mounts 904, 906, 908 that include respective adjustment mechanisms 920, 922, 924 and surface mounting portions 930, 932, 934. The surface mounting portions 930, 932, 934 are configured for mounting to various surfaces such as a office window using an adhesive, an adhesive pad, or other method. The adjustment mechanisms 920, 922, 924 are attached to the optical support 902 with an adhesive. Alternatively, mounting holes, surfaces, tabs, or other features can be provided as part of the optical support 902, particularly for plastic optical supports. Mounts for optical transceivers are preferably configured for compactness, ease of installation, and to be unobtrusive after installation and the arrangement of FIG. 9 permits easy installation and alignment.

Figure 10A:
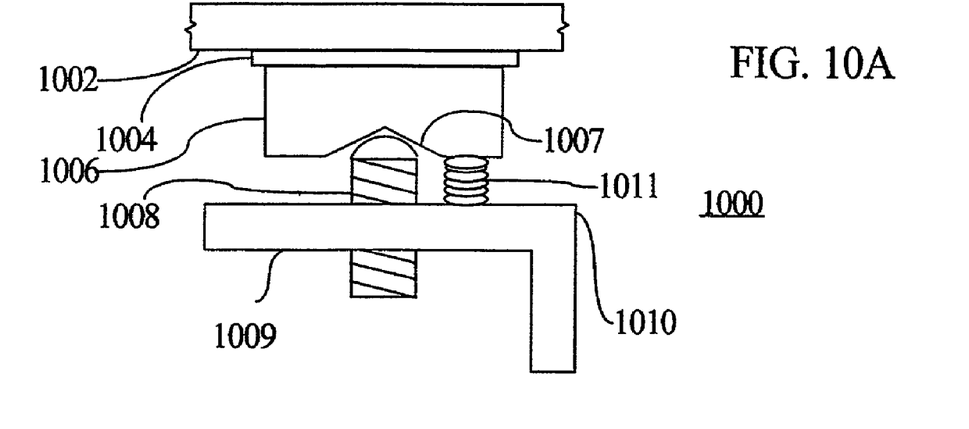
FIGS. 10A–10B are schematic diagrams of optical mounting and alignment mechanisms for mounting an optical transceiver to a window.
Figure 10B:
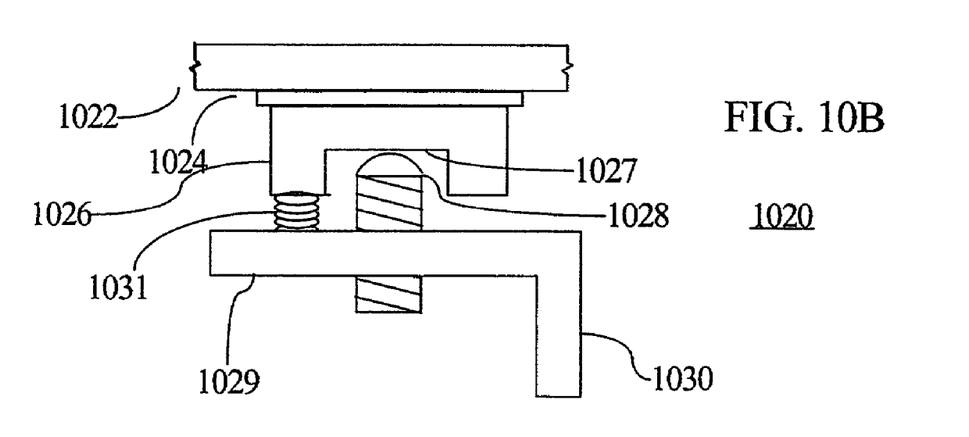

FIGS. 10A–10B are schematic diagrams illustrating alignment and mounting mechanisms suitable for use in the apparatus of FIG. 9. Referring to FIG. 10A, an alignment mechanism 1000 includes a groove plate 1006 configured to be bonded with an adhesive layer 1004 to a window 1002. A groove 1007 is defined in the groove plate 1006 and is configured to receive an adjustment screw 1008 of an adjustment plate 1009. A spring 1011 or the like is situated to urge the adjustment plate 1009 toward the groove plate 1006 so that the adjustment screw 1008 contacts the groove plate 1006. A surface 1010 of the adjustment plate 1009 is configured for mounting to an optical transceiver.

Referring to FIG. 10B, an alignment mechanism 1020 includes a slot plate 1026 configured to be bonded with an adhesive layer 1024 to a window 1022. A slot 1027 is defined in the plate 1026 and is configured to receive an adjustment screw 1028 of an adjustment plate 1029. A spring 1031 or the like is situated to urge the adjustment plate 1029 toward the plate 1026 so that the adjustment screw 1028 contacts the plate 1026. A surface 1030 of the adjustment plate 1029 is configured for mounting to an optical transceiver.

The alignment mechanisms of FIGS. 10A–10B are based on so-called kinematic mounts, but other alignment mechanisms can be based on flexure mounts or gimbal mounts. Such mechanisms can be provided individually for attachment to an optical transceiver and to a window through which a transceiver is to send or receive optical signals. Using such mounts permits an optical transceiver at a selected location to be configured to communicate with an optical transceiver at another location.

Figure 11:
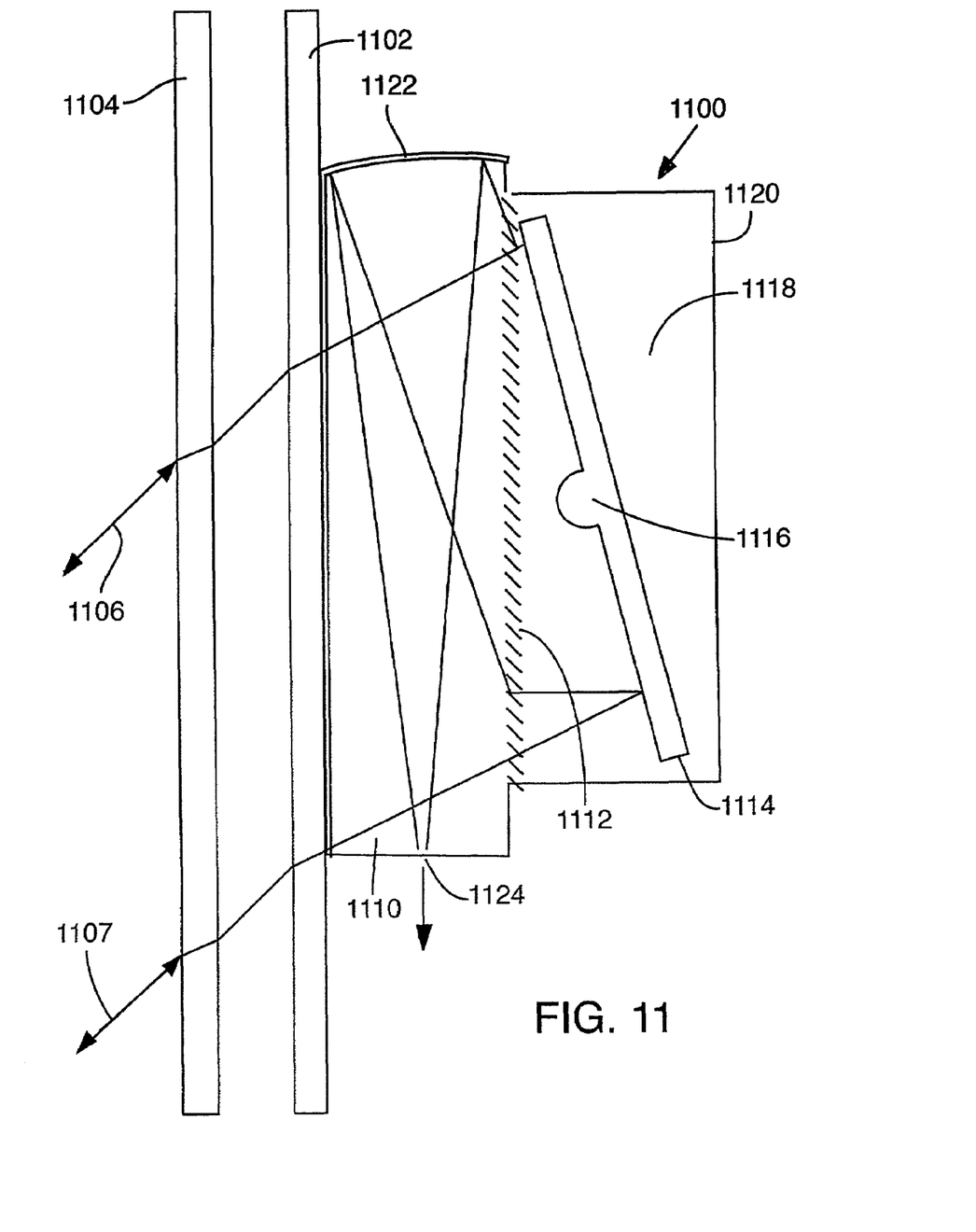
FIG. 11 is a schematic diagram of an optical transceiver that includes a mirror that directs an optical signal to a hologram or other diffractive element.

With reference to FIG. 11, an optical transceiver 1100 is attached to a first window 1102 and is configured to send and receive optical signals through the first window 1102 and a second window 1104 along a path defined by ray directions 1106, 1107. The optical transceiver 1100 includes an optical support 1110 and a hologram 1112. An input optical signal propagates through the windows 1102, 1104, the optical support 1110, and the hologram 1112 and is reflected by a steering mirror 1114 back to the hologram 1112. The mirror is configured to be rotatable about gimbals 1116 and in one embodiment is immersed in an index matching material 1118 such as an index matching liquid that is retained by a container 1120. A curved reflective surface 1122 is provided on the optical support 1110, and typically corresponds to an off-axis section of a parabola. The input optical signal received by the transceiver 1100 is directed to the steering mirror 1114 that is aligned with the gimbals 1116 so that a diffracted portion of the reflected optical signal is directed to the parabolic mirror 1122 and converged to an output 1124. By adjustment of the steering mirror 1114, optical signals from a variety of remote locations can be detected. Similarly, an optical signal applied to the output 1124 can be delivered to a selected remote location by adjustment of the steering mirror 1114. The mirror can also be configured to be steered about with, for example, a set of mutually orthogonal gimbals for two dimensional coverage.

Figure 12:
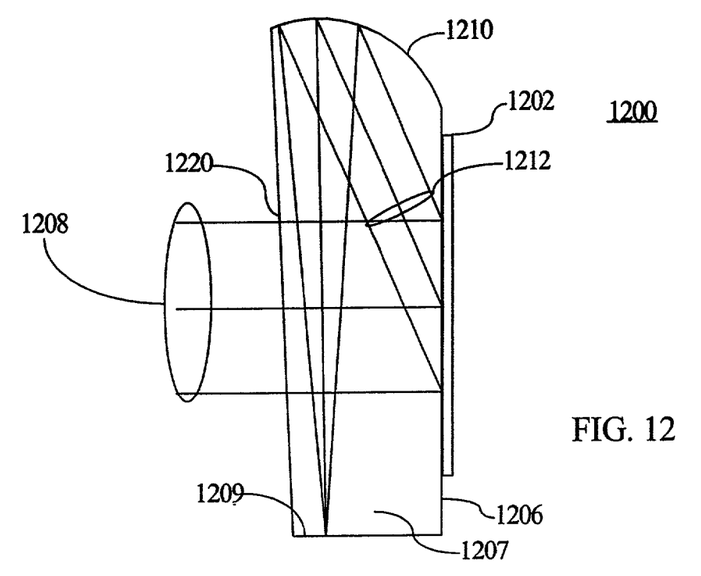
FIG. 12 is a schematic diagram of an optical transceiver that includes a reflection hologram.

An example optical transceiver 1200 using a reflective hologram 1202 is illustrated in FIG. 12. The hologram 1202 is attached to a surface 1206 of an optical support 1207 and is configured to direct at least a portion 1212 of an input optical signal 1208 to a curved reflective surface 1210 and to a coupling surface 1209. As shown in FIG. 12, a surface 1220 through which optical signals enter and/or exit the optical support 1207 is tilted with respect to the surface 1206. For convenience, refraction of the input optical signal 1208 at the surface 1220 is not shown but the optical signal 1208 need not enter the optical support 1208 perpendicularly to the surface 1220. The hologram 1202 is typically configured to deflect optical signals of selected wavelengths to the curved reflective surface 1210 and transmit other wavelengths. In addition, the deflected optical signal portion 1212 typically propagates at an angle greater than a critical angle with respect to the surface 1206.

Figure 13:
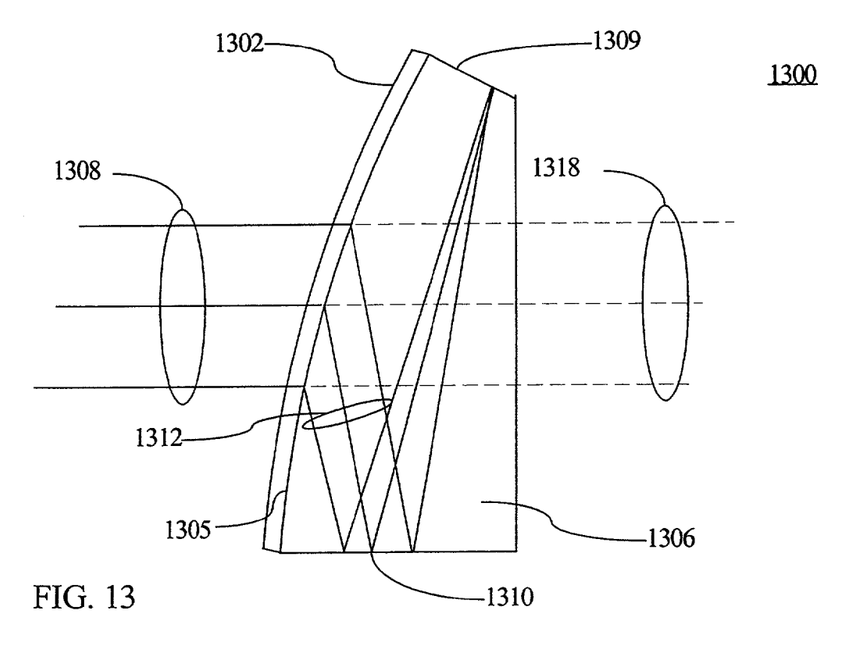
FIG. 13 is a schematic diagram of an optical transceiver that includes a hologram situated on a curved surface.

An optical transceiver 1300 illustrated in FIG. 13 includes a hologram 1302 situated on a curved surface 1305 of an optical support 1306. The hologram 1302 is configured to deflect a portion 1312 of an input optical beam 1308 to a reflective surface 1310 and to coupling surface 1309. As shown in FIG. 13, an optical beam 1318 associated with, for example, vision through the optical transceiver 1300 with optical radiation at wavelengths transmitted by the hologram 1302.

Figure 14:
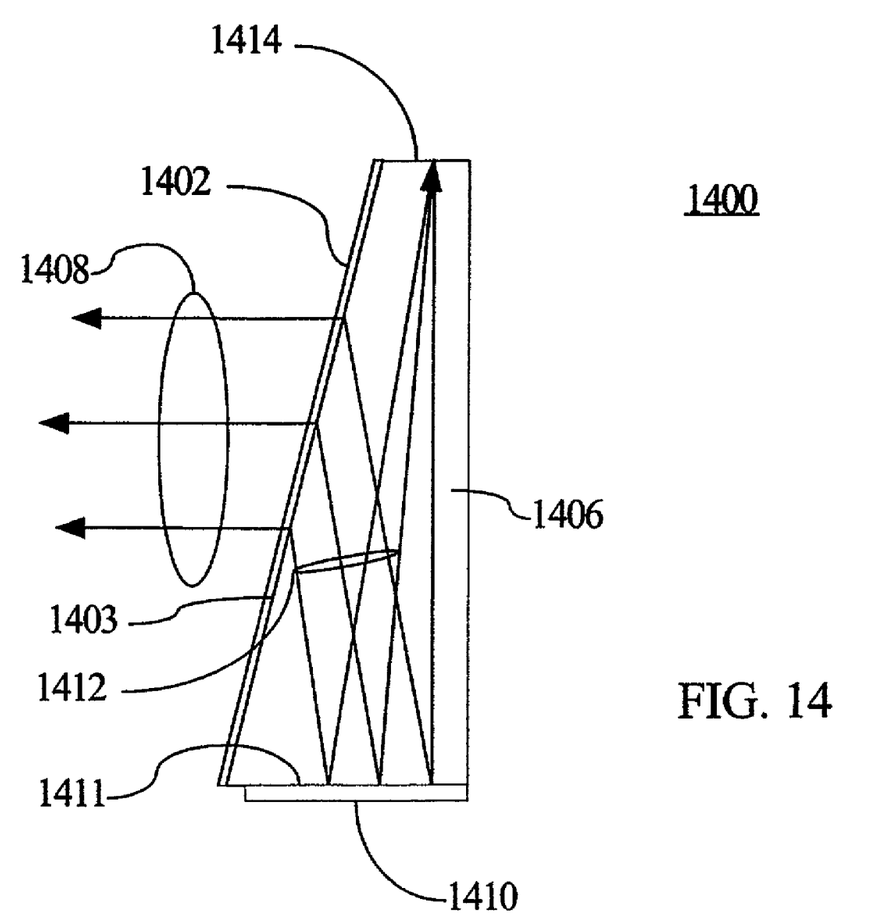
FIG. 14 is a schematic diagram of an optical transceiver that includes first and second holograms that direct an optical beam toward a coupling surface and converge, the optical beam at the coupling service, respectively.

With reference to FIG. 14, an optical transceiver 1400 includes holograms 1402, 1410 situated at respective surfaces 1403, 1411 of an optical support 1406. The hologram 1402 is configured to direct a portion 1412 of the optical beam 1408 to the hologram 1410 that converges or partially converges the portion 1412 at, near, or through a coupling surface 1414. The optical transceiver 1400 does not include curved optical surfaces that provide optical power but instead includes the hologram 1412. While the hologram 1402 can be configured to direct the optical beam 1408 to the surface 1411 as well as converge the optical beam 1408, providing two holograms simplifies hologram fabrication.

Figure 15:
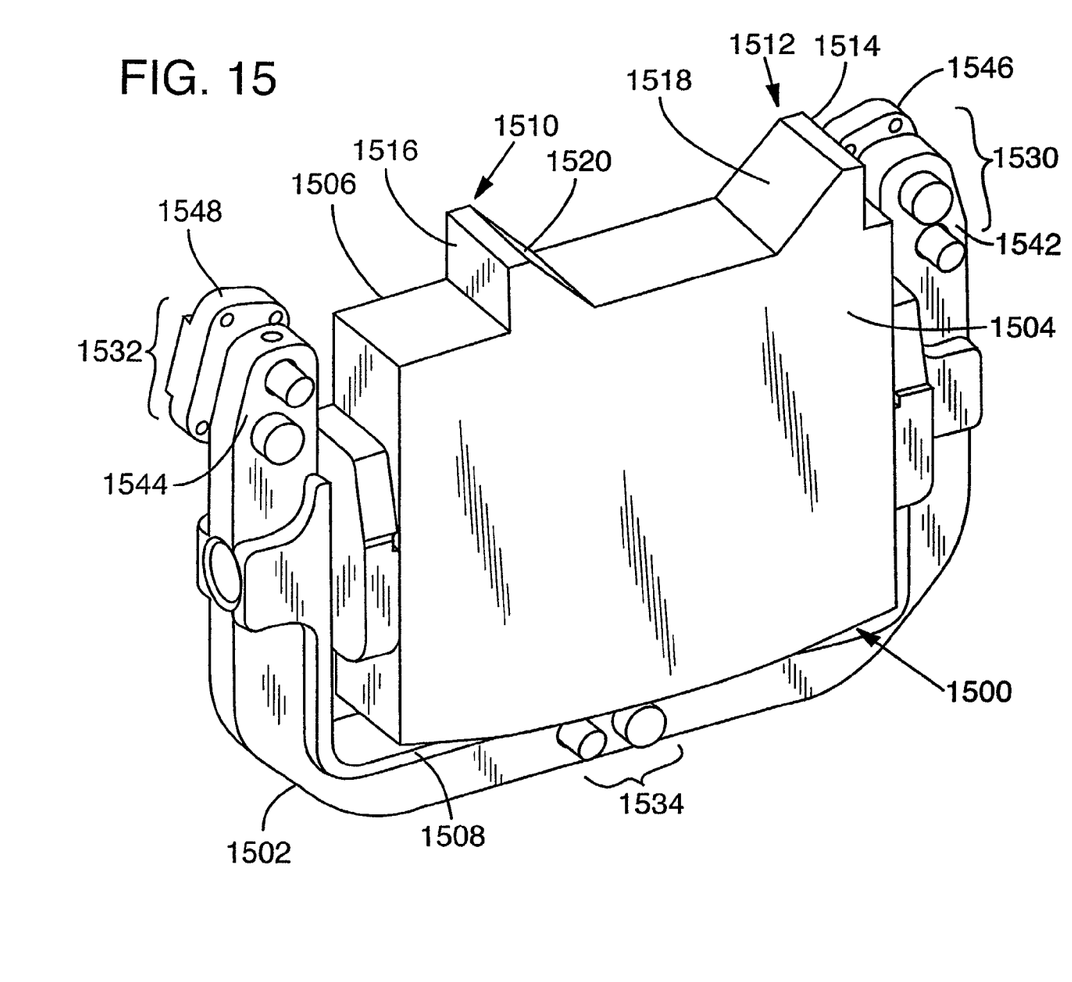
FIGS. 15–16 are perspective views of optical transceivers configured to transmit and receive spatially separated optical signals.

With reference to FIG. 15, an optical transceiver 1500 is retained by a pointing assembly 1502 that is configured to direct optical signals to or receive optical signals from a selected location. The optical transceiver 1500 includes an optical support 1504 having an input/output surface 1506 and a focusing surface 1508. A transmit hologram and a receive hologram can be provided on the surface 1506, or a single hologram can be used. The transmit hologram directs an optical signal that is directed from an transmit prism portion 1510 to the surface 1508 and that is then transmitted through the surface 1506. Received optical signals are direct by an input hologram to the focusing surface 1508 and then directed to a receive prism portion 1512. Optical signals can be coupled into and out of the optical support 1504 at coupling surfaces 1514, 1516 with respective reflective prism surfaces 1518, 1520.

The pointing assembly 1502 includes adjustment mechanisms 1530, 1532, 1534 so that the optical transceiver 1500 can be configured to send and/or receive optical signals from a selected location. The adjustment mechanisms 1530, 1532 include fixed portions 1542, 1544 that are fixed with respect to the optical support 1504, and reference portions 1546, 1548 that are configured for attachment to a mounting surface such as, for example, a window. The adjustment mechanism 1534 can be similarly configured.

Figure 16:
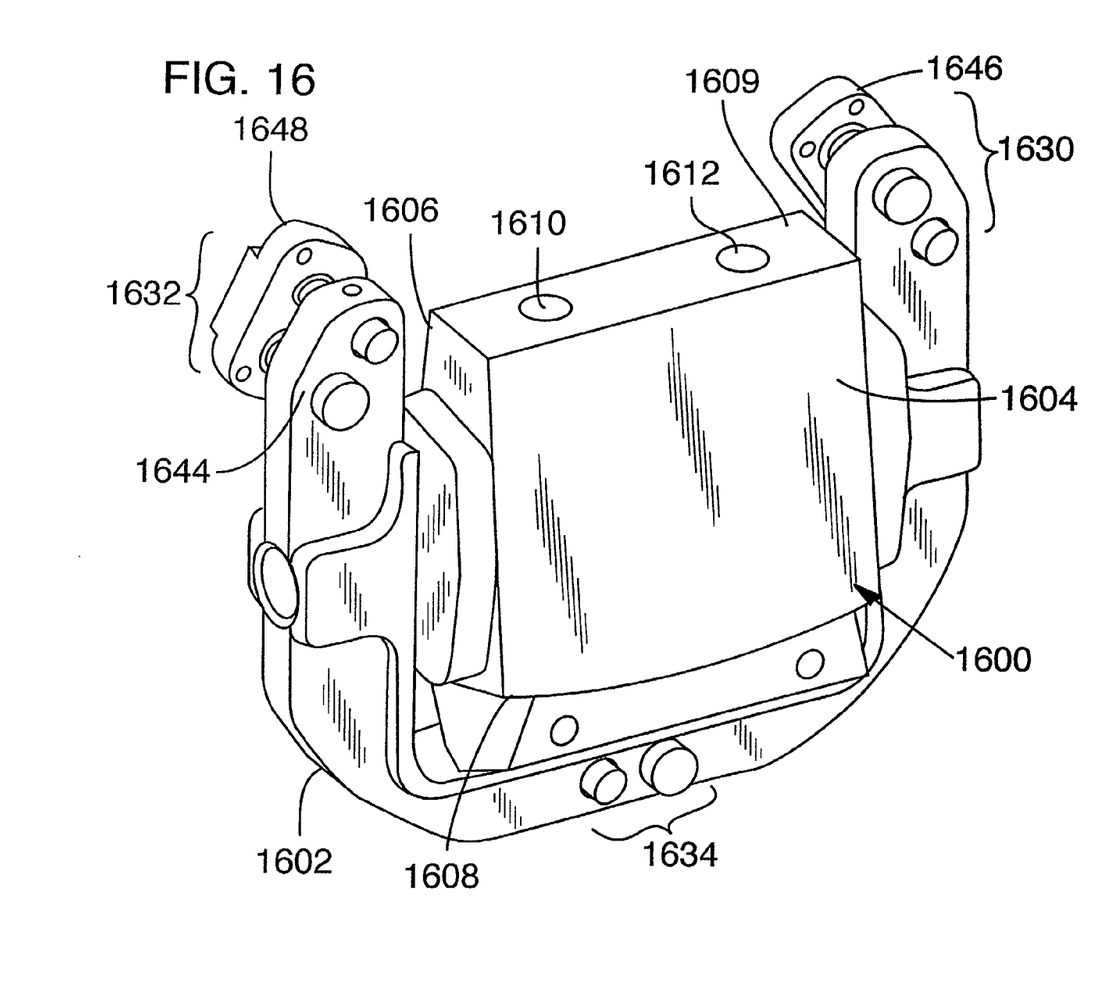

With reference to FIG. 16, an optical transceiver 1600 is retained by a pointing assembly 1602 that is configured to direct optical signals to or receive optical signals from a selected location. The optical transceiver 1600 includes an optical support 1604 having an input/output surface 1606 and a focusing surface 1608. A transmit hologram and a receive hologram can be provided on the surface 1606, or a single hologram can be used. The transmit hologram directs an optical signal that is directed from a transmit portion 1610 of a coupling surface 1609 to the surface 1608 and that is then transmitted through the surface 1606. Received optical signals are direct by an input hologram to the focusing surface 1608 and then directed to a receive portion 1612 of the coupling surface 1609.

The pointing assembly 1602 includes adjustment mechanisms 1630, 1632, 1634 so that the optical transceiver 1600 can be configured to send and/or receive optical signals from a selected location. The adjustment mechanisms 1630, 1632 include fixed portions 1642, 1644 that are fixed with respect to the optical support 1604, and reference portions 1646, 1648 that are configured for attachment to a mounting surface such as, for example, a window. The adjustment mechanism 1634 can be similarly configured.

The invention is described with reference to representative examples and it will be apparent that these examples can be modified in arrangement and detail without departing from the scope of the invention. For example, optical supports can include reflective or refractive optical surfaces defined by polished, molded, or machined surfaces of the optical support, or by optical surfaces bonded to surfaces of an optical support. A transceiver can be configured to transmit, receive, or transmit and receive. Two or more diffractive elements can be provided on an optical support for transmission and reception, respectively. A curved surface can be configured to receive and converge optical signals from a receiver hologram and to deliver optical signals to a transmitter hologram. Such a curved surface can be configured so that received and transmitted optical signals are directed to a first convergence region and received from a second convergence region, respectively. For example, separate fiber cables can be used for received optical signals and for optical signals to be transmitted. A transceiver can include respective holograms for transmit and receive functions, and reflective and/or refractive surfaces can be formed that direct optical signals to and from the respective holograms. We claim all that is encompassed by the appended claims.

We claim:

1. An optical transceiver, comprising:
   a diffractive optical element (DOE);
   an optical support having at least a first surface, a second surface, and a third surface, wherein the DOE is attached to the third surface and is configured to direct at least a portion of a free space optical signal to the first surface and wherein the first surface has a curvature configured to converge the portion of the free space optical signal and direct the converged portion to the second surface, and further wherein the DOE is configured so that the portion of the free space optical signal directed by the DOE to the first surface propagates at an angle that is greater than or equal to a critical angle with respect to the third surface.

2. The optical transceiver of claim 1 wherein the DOE is a transmission hologram.

3. The optical transceiver of claim 1 wherein the DOE is a reflection hologram.

4. The optical transceiver of claim 1 wherein the DOE is configured to direct free space optical signals in a selected wavelength range to the first surface.

5. The optical transceiver of claim 4 wherein the DOE is configured so that free space optical signals outside of the selected wavelength are not directed to the first surface.

* * * * *